United States Patent [19]
St. Denis

[11] Patent Number: 5,542,496
[45] Date of Patent: Aug. 6, 1996

[54] ROBOTIC CENTERING DEVICE

[76] Inventor: Carroll R. St. Denis, Suite 14 - 114 Kildare Avenue E., Winnipeg, Manitoba, Canada, R2C 0P2

[21] Appl. No.: 338,879

[22] Filed: Dec. 15, 1994

[51] Int. Cl.⁶ .................................................. B66B 9/02
[52] U.S. Cl. ........................................ 182/133; 182/141
[58] Field of Search ................................... 182/133, 141

[56] References Cited

U.S. PATENT DOCUMENTS

| | | | |
|---|---|---|---|
| 2,174,525 | 10/1939 | Padernal | 182/133 |
| 2,477,922 | 8/1949 | Emery | 182/133 X |
| 2,482,392 | 9/1949 | Whitaker | 182/133 X |
| 2,581,479 | 1/1952 | Grasham | 182/133 X |

FOREIGN PATENT DOCUMENTS

| 1275253 | 8/1968 | Germany | 182/133 |
|---|---|---|---|

WO92/04269 3/1992 WIPO.

*Primary Examiner*—Alvin C. Chin-Shue
*Attorney, Agent, or Firm*—Robert W. B. Bailey

[57] ABSTRACT

A circular robotic device has retractable extendible surface engaging drives controlled by linear actuators. A pressure transducer indicates the pressure exerted by one such drive on the surface if the pressure is to high the drives are retracted, if the pressure is too low the drives are extended. A more sophisticated version controls the pressure exerted by each drive independently. In a pole centering version this providing a tight clamp allows the device to climb and descend the typically tapered poles. The device can prime and paint poles to predetermined thickness, as well as sandblast the poles. In a pipe cleaning version the drive engage the internal surface of a pipe. The pipe cleaning version carries pipe cleaning and/or X-ray equipment. A microprocessor monitors the device and provides status information to a remote control unit.

20 Claims, 6 Drawing Sheets

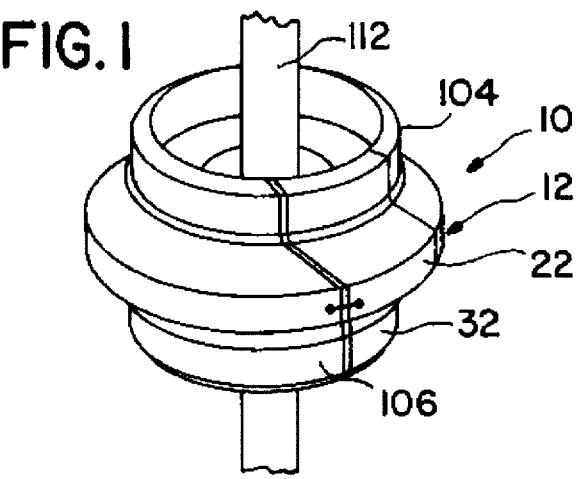
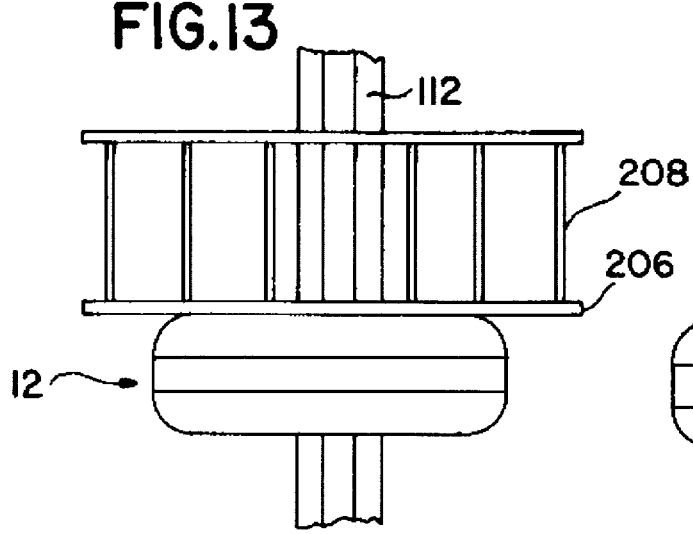
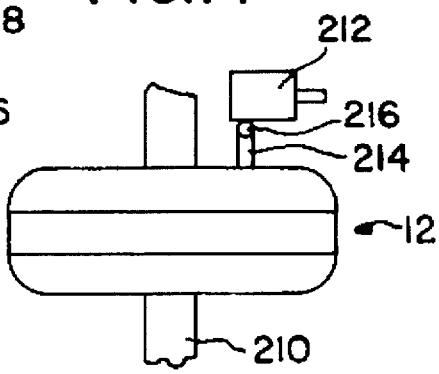
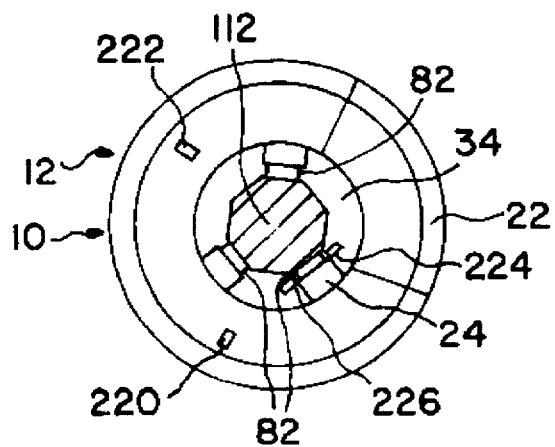

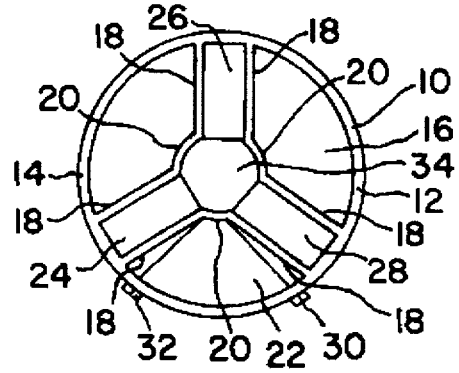
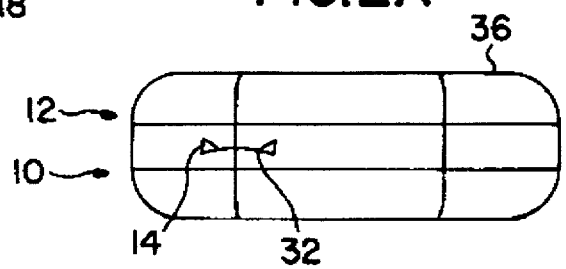
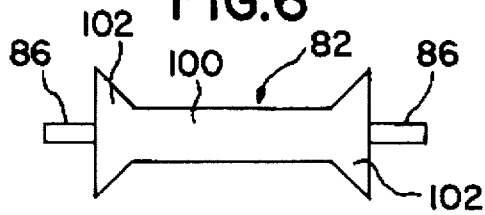
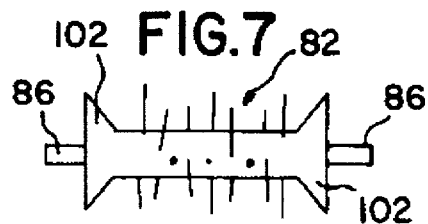
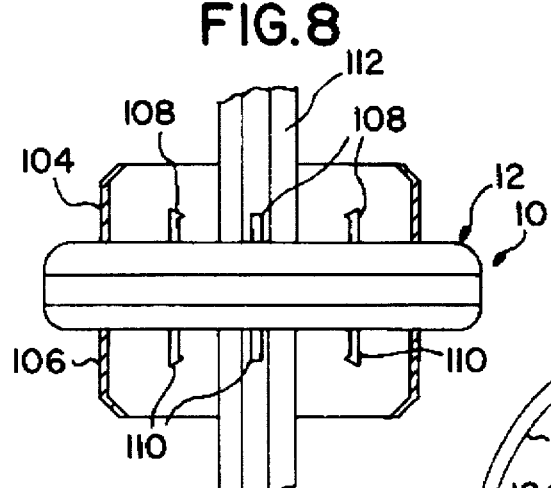
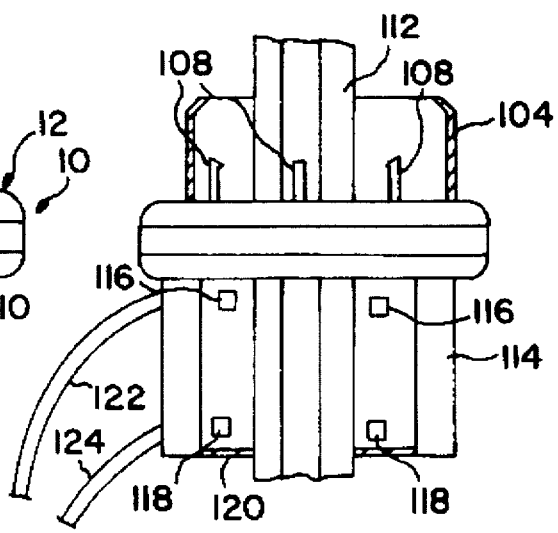

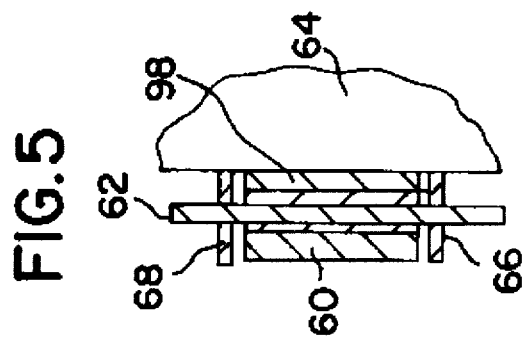
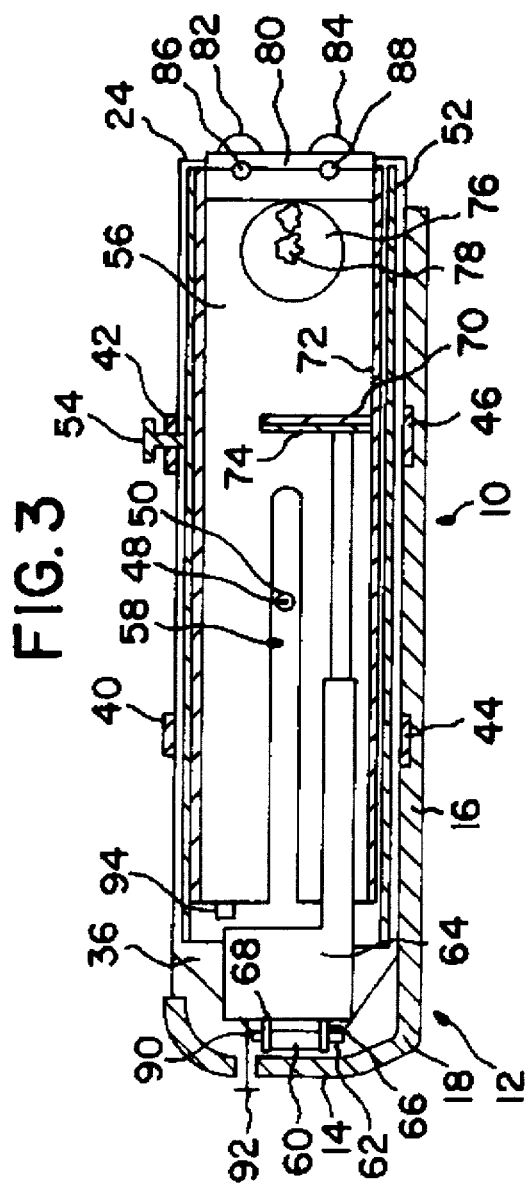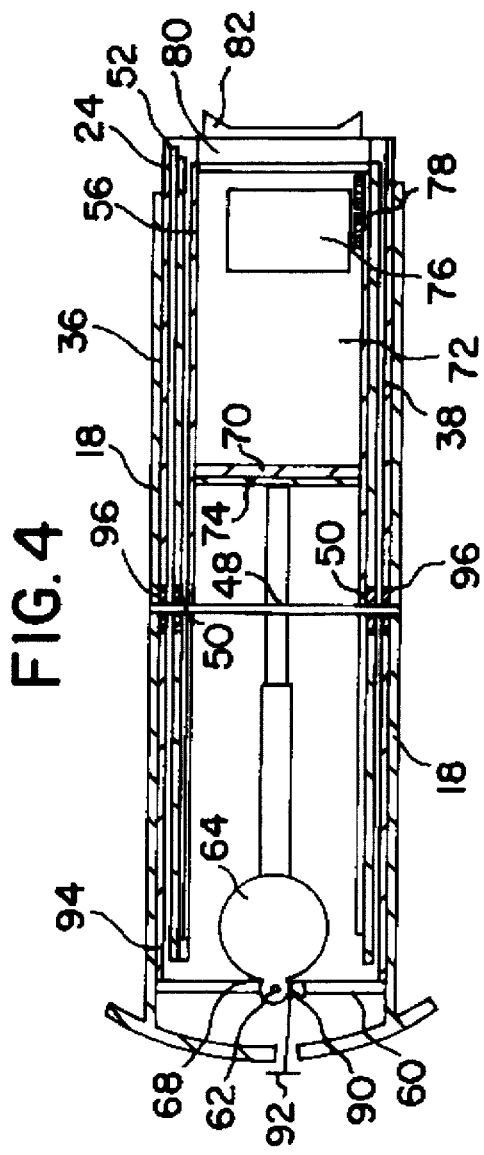

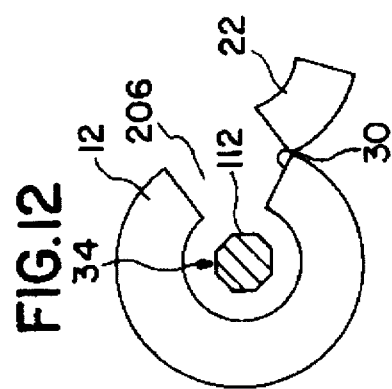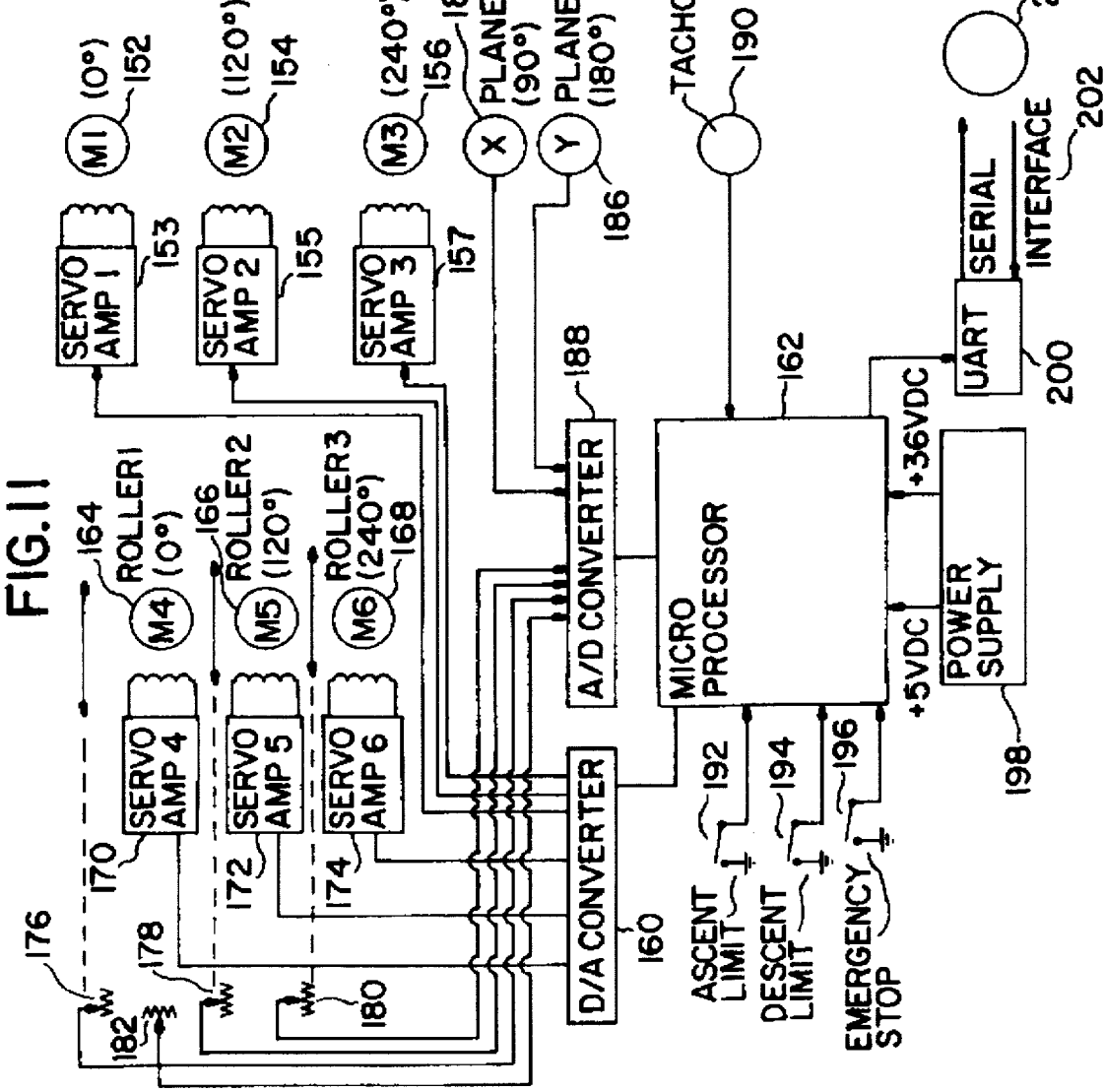

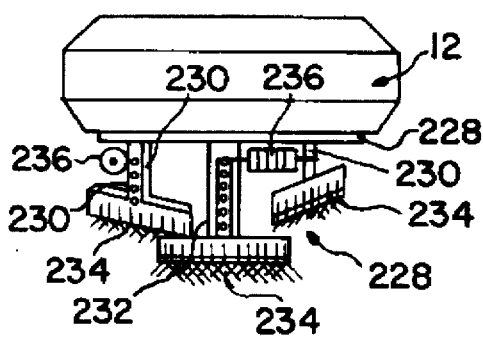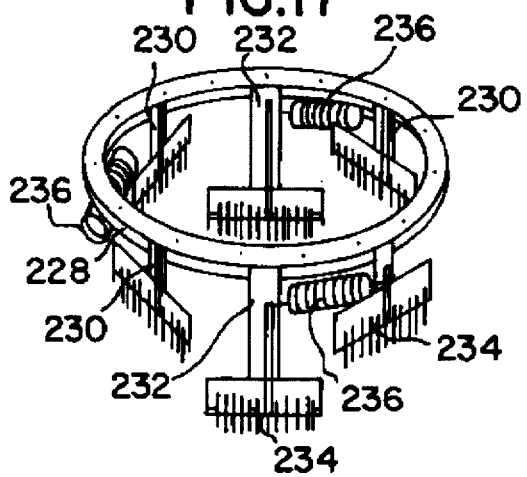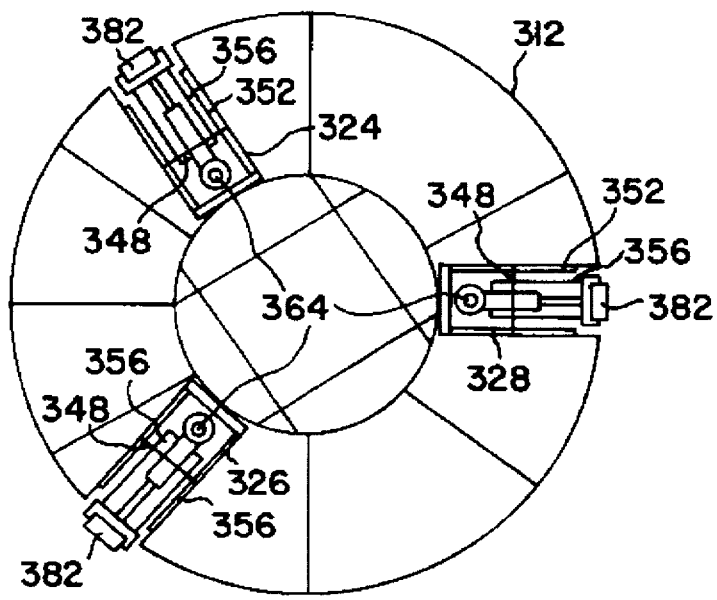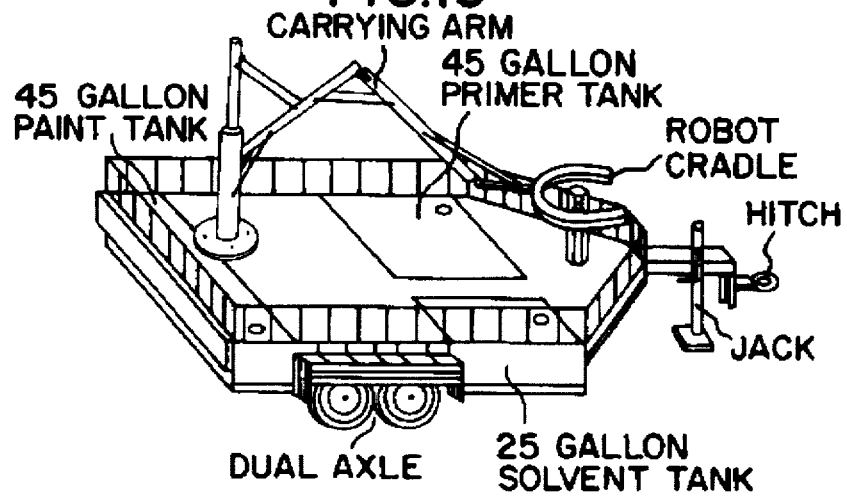

ROBOTIC CENTERING DEVICE

This invention relates to robotic centering devices capable of engaging peripheral surfaces and moving the device while engaged. Such robotic devices may be capable of climbing a pole, which are used to provided a base, for pole treating or measuring equipment and the like. It also relates to processes of treating poles using such devices. Other such robotic devices may be capable of moving through a pipe.

Poles, standards, pillars or posts bearing telephone, telegraph, hydro lines, lamps or lights and the like were typically wooden. Modern replacements are generally taller and made of metal or concrete, which cannot usually be climbed using spikes, typically requiring hydraulically raised platforms or buckets of the cherry picker type. Taller poles in any event increase the risk of injury to workers.

A remote controlled pole centering device, capable of climbing a pole and providing a base for pole treating and measuring equipment and the like is needed. As poles and the like vary in size and often taper upwardly the device must be adjustable as to pole size, similarly the device must be self centering, so spray guns and the like mounted thereon, are equidistant from the pole.

The present invention contemplates remote controlled robotic centering devices, which may be capable of climbing poles and carrying pole treating and measuring equipment and the like, and processes of treating poles using such devices, or which may be capable of passing through pipes and carrying pipe treating and measuring equipment and the like, and processes of treating pipes using such devices.

Although the invention will be described and referred to specifically as it relates to remote controlled robotic pole and pipe centering devices, capable of climbing poles and carrying pole treating and measuring equipment and the like, and processes of treating poles using such devices, as well as capable of passing through pipes and carrying pipe treating and measuring equipment and the like, and processes of treating pipes using such devices, it will be understood that the principles of this invention are equally applicable to similar devices and processes and accordingly, it will be understood that the invention is not limited to such devices.

BACKGROUND OF THE INVENTION

Poles require maintenance, typically sandblasting, priming and painting, which is more easily carried out by a robotic device. Pipes require internal cleaning and checking which is again more easily carried out by a robotic device.

PRIOR ART

The closest prior art applicant is aware of is the device described in PCT/CA90/00272, published as WO 92/04269, 19 Mar. 1992 to Vandal. This describes a remote controlled apparatus having three roller drives pneumatically urged against the pole. This version did not work too well, because the pneumatic pressure was not stable enough to keep the pressure constant, so it oscillated causing the device to bounce up and down on the pole. Also the device was made of metal and was unable to carry working electrostatic spray paintguns, because they did not ground properly. Government approval was not obtained because of this electrical problem. The application shows linear actuators may be used instead of pneumatic pistons, but in fact no such device was built.

It is primary object of the invention to provide a robotic centering device that engages to peripheral surfaces and can move relative thereto. It is a further primary object of the invention to provide a robotic pole centering device that clamps to poles, and can climb and descend without jamming. It is a further primary object of the invention to provide a robotic pipe centering device that engages pipes internally and can pass therethrough without jamming. It is a secondary object to provide tiltable drive means that can vary the angle sufficiently to engage the pole or pipe surface snugly. It is a further secondary object to prevent the device binding to or slackening off the pole or pipe, by retracting or extending the drive means. It is a further secondary object to use a microprocessor to control the device. Other objects will be apparent to those skilled in the art from the following specification and accompanying drawings and appended claims.

DESCRIPTION OF THE INVENTION

The invention in one aspect is a robotic centering device to engage peripheral surfaces. A circular base means has at least three peripheral surface engaging drive means operatively associated with it. Separate positioning means position each surface engaging drive means in engagement with the surface. Pressure sensing means are operatively associated with at least one of the surface engaging drive means. Control means for the positioning means actuate actuating the separate positioning means toward the surface when the pressure sensing means indicates a pressure less than a predetermined value. The control means actuate the separate positioning means away from the surface when the pressure sensing means indicate a pressure greater than the predetermined value. In one form preferably the peripheral surface is externally integral to pole means and the base means is ring means to encompass the pole means, having gate means pivotable between a first closed position and a second open position, whereby the pole means can enter and leave the ring means. In another form preferably the peripheral surface is internally integral to pipe means. At least three and preferably three pole engaging drive means are operatively associated with the ring means. Each drive means has separate positioning means to position it in engagement with said pole means. Pressure sensing means are operatively associated with at least one pole engaging drive means. The control means for the positioning means actuates the separate positioning means toward said pole means when the pressure sensing means indicates a pressure less than a predetermined value. It also actuates the separate positioning means away from the pole means when the pressure is greater than said predetermined value. Conveniently the control means actuates all the positioning means. Preferably the pressure sensing means is strain gauge transducer means, and the positioning means are linear actuator means operatively associated with each said pole engaging drive means.

The surface engaging drive means are preferably mounted within pivotable guide means, which are pivotable between a first upper position and a second lower position, about a central pivot means mounted within said base means. Preferably the pivotable guide means has adjustments means to adjust the first upper position. In one form preferably the peripheral surface is externally integral to pole means and said the base means has ring means to encompass the pole means. The ring means has gate means pivotable between a first closed position and a second open position, whereby the pole means can enter and leave the ring means. In another preferred form the peripheral surface is internally integral to pipe means. The pole engaging drive means preferably include reversible polarity electric motor means driving vertically spaced apart horizontal pole engaging roller means. More preferably the reversible polarity motor means are operatively interconnected to said roller means by gearing means. Suitably each pole engaging drive means is fixedly mounted within first housing means slidably mounted within second housing means, which is pivotally mounted about its center radial to the ring means having free movement between a first upper position and a second lower position, conveniently set screw means are mounted within the ring means whereby the first upper position can be adjusted. Typically the linear actuator means are operatively associated with the first and third housing means to position each pole engaging drive means in engagement with the pole means. Preferably the second housing means is pivotally mounted within the third housing means, which is radially mounted within the ring means. Conveniently pressure sensing means is operatively associated with at least one pole engaging drive means, with control means for the linear actuator means actuating all the linear actuator means toward the pole means when the pressure sensing means indicates a pressure less than a predetermined value, and actuating all the linear actuator means away from the pole means when the pressure sensing means indicates a pressure greater than the predetermined value. Preferably the pressure sensing means is strain gauge transducer means, which may be first strain gauge transducer means mounted between one linear actuator and associated third housing means, and second strain gauge transducer means mounted between first housing means and associated second housing means.

A preferable control system for a robotic pole centering device is provided. Where the device has circular base means and at least three surface engaging drive means operatively associated with the base means at least three pole engaging drive means are operatively associated with the ring means, and separate positioning means are provided to position each pole engaging drive means in engagement with pole means. There are pressure sensing means operatively associated with at least one pole engaging drive means. The control system comprising analog input means indicating the positions of each separate positioning means, and analog input means indicating the pressure exerted by at least one pole engaging means. Analog to digital converter means convert analog inputs to digital inputs to microprocessor means. There are means to compare the digital pressure input to a predetermined reference signal. Digital output means control speed of all the pole engaging drive means. Digital output means actuate the separate positioning means for each aid pole engaging drive means when the digital pressure input differs from the predetermined reference signal. Digital to analog converter means to convert digital outputs to analog outputs. The digital output means to actuate the separate positioning means causes each pole engaging drive means to retract from the pole means when the digital pressure input is greater than the predetermined reference signal. The digital output means to actuate the separate positioning means causes each pole engaging drive means to extend toward from the pole means when the digital pressure input is less than the predetermined reference signal. Paired tilt sensor analog input means, may provide tilt information in two vertical planes at right angles to each other, connected to the analog to digital converter means. Tachometer means may be operatively associated with at least one pole engaging drive means providing direct digital input to the microprocessor means. Ascent limit, descent limit and emergency stop switch means may provide direct digital input to the microprocessor means. Preferably serial digital interface means communicate between the microprocessor and a remote status display and control unit. Preferably the base means includes ring means means to encompass a pole means, which has gate means pivotable between a first closed position and a second open position, whereby the pole means can enter an leave the ring means.

The base has a motor drive system for the rollers to climb and descend the pole, a roller positioning system, and a control system, which may be manual or computerized or a mixture of both. The base may carry a variety of equipment, but is designed so that it can be used to carry equipment to prime, paint and sand blast poles among other applications.

Typically the motor drive system consists of 3 low voltage DC reversible gearhead motors, each connected to drive an identical independent roller unit to engage the pole, spaced at 120° intervals around the pole to be climbed. The roller positioning system typically consists of 3 identical low voltage DC reversible linear actuators each connected to extend and retract one independent roller unit so that the roller unit remains in contact with the pole as its radius changes with ascent or descent. In the computerized version, an analog indication of the relative amount of the extension of each actuator is provided. Typically a tilt sensor in two vertical planes indicates the angle of tilt of the base. In the computerized version, and analog indication of the tilt in each plane greater than ±20° is provided. Strain gauge transducers indicate the pressure at one roller unit as it clamps the pole, and also the pressure exerted by one linear actuator. Typically a tachometer attached to a roller indicates the rate of ascent or descent of the base. Preferably all of the above sensors are monitored by a micro-controller, which also controls the motor systems. The micro-controller will also accept commands and provide status information to a remote control unit via a preferably serial digital communications interface. Typically a ground remote control unit and power supply is connected to the base by an electrical cable and a preferably serial bidirectional communication channel.

When the micro-controller is present the roller drive motors are controlled so rate of ascent/descent and tilt remain at their programmed settings. A typical basic algorithm operates as follows

```
Do
    If rate>required rate
            reduce all motor power .5%
    Else if rate<required rate
            increase all motor power .5%
    Endif
    If 0 plane tilt>positive limit
            reduce 0 degree motor power .5%
            increase 120 degree motor power .5%
    Else if 0 plane tilt<negative limit
            reduce 120 degree motor power .5%
            increase 0 degree motor power .5%
    Endif
    If 1 plane tilt>positive limit
            reduce 120 degree motor power .5%
            increase 240 degree motor power .5%
    Else if 1 plane tilt<negative limit
            reduce 240 degree motor power .5%
            increase 120 degree motor power .5%
    Endif
Loop
```

When the micro-controller is present the roller positioning motors (linear actuators) are maintained in constant concentric position around the pole, and the pressure of the rollers against the pole remains at the programmed setting. A typical basic algorithm operates as follows

```
Do
    If pressure<minimum pressure
        step all actuators +.5%
    Else if pressure>maximum pressure
        step all actuators -.5%
    Endif
    If actuator 0>actuator 120 position
        step actuator 0 -.5%
        step actuator 120 +.5%
    Else if actuator 0<actuator 120 position
        step actuator 0 +.5%
        step actuator 120 -.5%
    Endif
    If actuator 120>actuator 240 position
        step actuator 240 +.5%
    Else if actuator 120<actuator 240 position
        step actuator 240 -.5%
    Endif
Loop
```

The rate of movement is programmed with manual override from the ground remote control unit.

When present the micro-controller has as outputs, the 0, 120 and 240 degree drive motors, the 0, 120 and 240 degree actuator motors, and a serial data transmit channel for ground monitoring. These outputs are typically "H" bridge circuits capable of pulse modulation into inductive motor loads of up to 36 VDC@5 amps, typically all analog outputs have 8 bits of resolution.

When present the micro-controller has as inputs the 0, 120 and 240 degree actuator position potentiometers, roller pressure sensor, 90 and 180 plane tilt sensors, climb rate tachometer, and a serial data receive channel for ground control. Typically all analog inputs have 8 bits of resolution.

A user interface when present is a ground based control panel, such as a laptop computer or similar microprocessor for all input and output controls and indicators. This should indicate ascent/descent rate and distance, roller pressure, all three actuator positions, base tilt in degrees in two vertical planes.

Additionally provision should be made to control through inputs and outputs, paint sprayer, paint air, sprayer cleaner and sand blaster solenoids, top and bottom of pole sensors, and fault detector inputs.

The CPU should typically be a single chip, typically a low power CMOS, having onboard 8KB ROM, onboard time, onboard 128KB RAM, 6 8 bit ADC channels, 5 input lines, 10 output lines and 1 UART. The support logic would typically include transient suppression, periodic reset control, input power filtration, and analog signal conditioning circuitry, 6 "H" bridge DC motor drives, LED status indicators, RS232 port electronics, and a ground computer.

The pipe centering version carries pipe cleaning equipment and/or X-ray equipment for checking the pipes.

BRIEF DESCRIPTION OF THE DRAWINGS

FIG. 1 is a perspective of an embodiment of the invention

FIG. 2A is a side elevational view of a related embodiment of the invention;

FIG. 2B is a top plan view of the embodiment of FIG. 2A;

FIG. 3 is a part sectional side view of a portion of the embodiment of FIG. 2A;

FIG. 4 is a part sectional top view of a portion of the embodiment of FIG. 2A;

FIG. 5 shows a sectional detail of FIGS. 3 and 4;

FIGS. 6 and 7 show rollers of the embodiment of FIG. 2A;

FIG. 8 shows a part sectional view of a configuration of the embodiment of FIG. 1;

FIG. 9 shows a part sectional view of a configuration of the embodiment of FIG. 2A;

FIG. 11 is a partial schematic of a control circuit of the invention;

FIG. 12 is a partly sectional view of an aspect of the embodiment of FIG. 2A;

FIGS. 13 and 14 show views of further configurations of the embodiment of FIG. 2A;

FIG. 15 shows a partly sectional view of an aspect of the embodiment of FIG. 2A;

FIG. 16 shows a configuration of the embodiment of FIG. 2A, FIG. 17 shows a detail of FIG. 17;

FIG. 18 shows a further embodiment of the invention;

FIG. 19 shows a trailer to carry an embodiment of the invention.

DESCRIPTION OF THE PREFERRED EMBODIMENT

Figure 10:
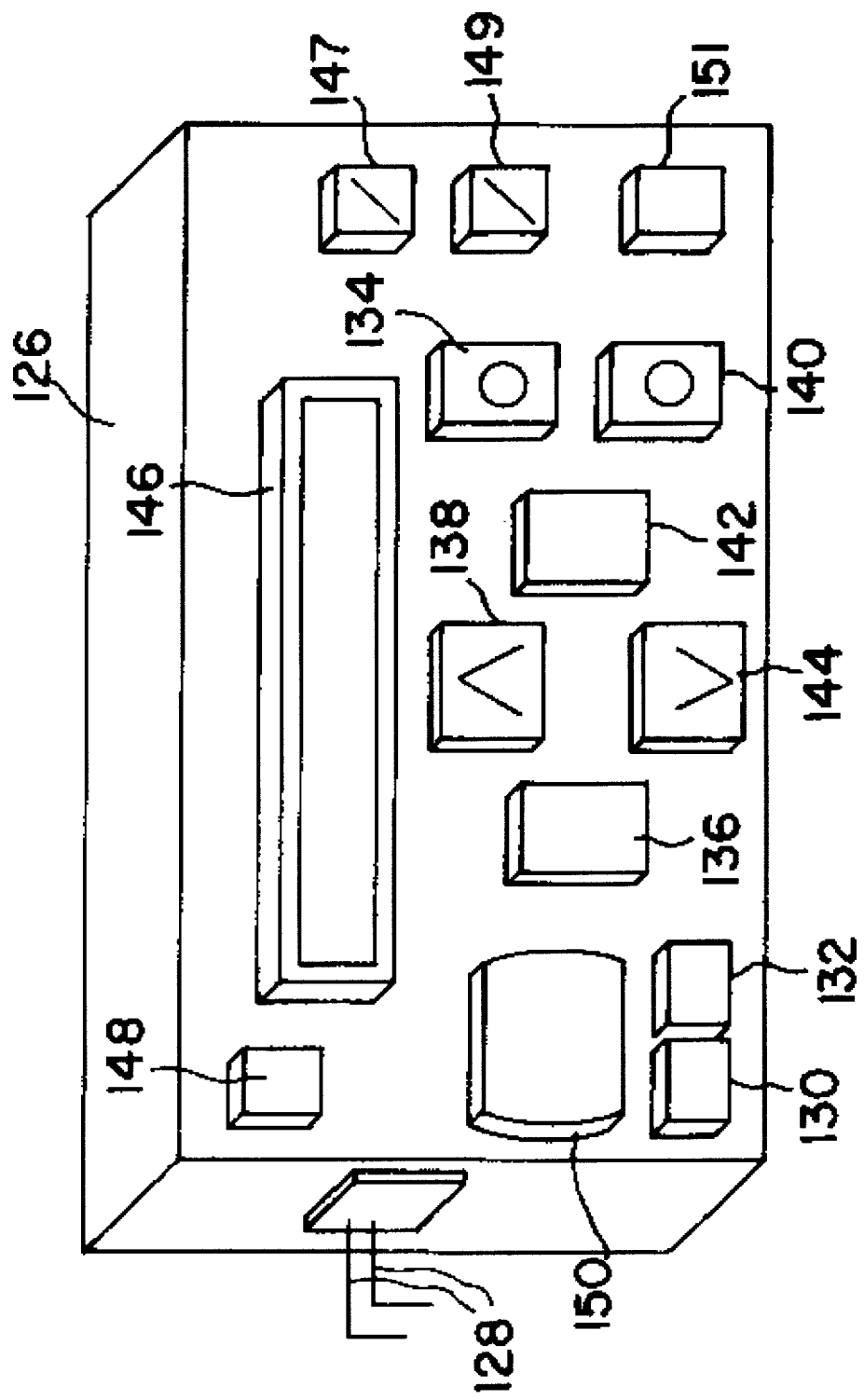
FIG. 10 shows a control panel of the invention.

In the drawings 10 indicates the robotic pole centering device. In FIG. 1 device 10 encircles pole 112, base 12 having openable gate portion 22, closed by latch 22, and upper cowling 104 and lower cowling 106. Device 10 includes a molded polymer fiberglass carriage base 12 which has outer circumferential wall 14, base wall 16, and radial walls 18, and inner circumferential wall 20, portion 22 of the carriage is hinged to the rest at pin 30 and latched by latch 32. Embedded between radial walls 18 are metal boxes 24, 26, and 28 which are designed to contain linear actuators and roller drive systems to engage pole means in central space 34. In practice separately molded top cover 36 is secured by conventional fastening means to carriage base 12. FIG. 12 shows portion 22 open to allow pole 112 to pass through gap 206, FIG. 15 shows the portion 22 closed with rollers 82 engaging pole 112, 90° tilt sensor 220 and 180° tilt sensor 222 are mounted on the upper surface of base 12, while ascent limit electronic eye 224 and descent limit electronic eye 226 are mounted external box 24 which houses the 0° motor.

Box 24 is molded into base 12, and consists of two metal, typically steel, side walls 36 and 38 molded into abutting radial walls 18, joined by upper and lower transverse braces 40, 42, 44, and 46, of which 44 and 46 are molded into base wall 16. Box 24 is typically about 13 to 15 inches long by 8 inches deep by 4½ inches wide, braces 40, 42, 44, and 46 are typically 1½ inches wide. Pivotally mounted on transverse pin 48 by bushing or bearing 50 is box 52, which is a rectangular tube of carbon fiber or aluminum or some similarly strong but light material as known to those skilled in the art. Box 52 fits within box 24 and slightly snaller in depth up to about ½ inch to allow pivoting of box 52 about pin 48, set screw or bolt 54 in inner top bracket 42 is used to control the play of box 52. Slidably mounted within box 52 is box 56, similarly it is a rectangular tube of carbon fiber or aluminum or some similarly strong but light material as known to those skilled in the art, slot 58 allows relative motion of box 56 with respect to box 52. Transverse plate 60 connects the outer ends of walls 36 and 38, vertical pin 62 passes through plate 60 and 24 volt DC reverse polarity linear actuator 64 is mounted thereon by brackets 66 and 68.

Linear actuator 64 extends inward to transverse plate 70 which is attached to floor 72 of box 56. Rubber pad 74 is in contact with actuator 64 and plate 70. At the inner end of box 56 are mounted 24 volt DC variable speed reverse polarity motor 76 which drives gear train 78 engaging more gears in gear box 80. Rollers 82 and 84 are mounted with gear box 80 by spindles 86 and 88 respectively. Outer strain gauge 90 is mounted on transverse plate 60 and engages linear actuator 64, adjustable by set screw 92, inner strain gauge 94 is mounted on box 52 and engages box 56. Pin 48 is mounted in box 52 by bushings or bearings 50, and in box 24 by bushings or bearings 96, removal of pin 48 allows, boxes 52 and 58 to be removed from box 24 and pole centering device 10 for maintenance and repair. Pin 62 is mounted in plate 60 within rubber tube 98, which allows give under pressure. Two types of rollers may be used, both rubber, one for steel, other metal, or concrete posts, with cylindrical barrel 100, and tapered end flanges 102, the second version for wooden poles has spikes 104 passing through or projecting from barrel 100.

In use after device 10 is closed around a post set screw 54 is manually adjusted, to change the range of tilt of box 52, allowing the angle of box 56 to be such that rollers 82 and 84 both engage the post, which in turn depends on the taper of the post. Smaller posts typically taper from about 12 to 4 inches, larger posts typically taper from 20 to about 6 or 7 inches, the tilt or rock required is greater on smaller posts, generally wooden posts taper less than metal or concrete.

Outer strain gauge 90, adjustable by set screw 92, measures the back pressure of linear actuator 64 on transverse plate 60, and thus on base 12. If this pressure is too high on a given post, this is indicated on the control panel and strain gauge 90 adjusted to set the maximum pressure, typically 90 foot-pounds. If the pressure indicated by strain gauge 90 is too low, then linear actuator 64 is actuated inward for a split second until the pressure reaches the desired maximum engaging the post. Linear actuator is actuated every inch or so, for inward movement going up the post. Outer strain gauge 90 is set to actuate the forward (inward) movement of the linear actuator, when strain (pressure) measured is too low.

Inner strain gauge 94, measures the back pressure of box 56 on box 52, and thus on rollers. If the pressure indicated by strain gauge 94 is too high, then linear actuator 64 is actuated outward for a split second until the pressure reaches the desired maximum engaging the post. Linear actuator is actuated every inch or so, for outward movement going down the post. Inner strain gauge 94 is set to actuate the reverse (outward) movement of the linear actuator, when strain (pressure) measured is too high.

Except when either strain gauge actuates the linear actuator, it is in neutral. There are only two strain gauges in box 24, which also control the linear actuators in boxes 26 and 28 by the same control circuits as linear actuator 64. When it is actuated inward so are they, when it is actuated outward so are they, when it is in neutral so are they. A manual override is provided in case the strain gauges do not work for whatever reason, and base 10 is stuck on the pole. The manual override switch actuates the linear actuators in reverse, slackening the grip on the pole.

Motor 76 is independently controlled from linear actuator 64, all three boxes 24, 26 and 28 contain such motors, which have several speeds so that the base when climbing or descending the pole can apply paint or primer to a thickness of 1, to 12 thousandths of an inch, by increments of 1 thousandth of an inch.

A sectional view of the embodiment of FIG. 1 is shown in FIG. 8, here upper cowling 104 and lower cowling 106 are mounted on base 12. Three electrostatic paint guns 108 are mounted within upper cowling 104, and three basically similar electrostatic primer guns 110, are mounted within lower cowling 106 to paint and prime pole 112. Another common configuration is shown in FIG. 9, where three electrostatic paint guns 108 are mounted within upper cowling 104, and sandblasting cylinder 114 is mounted below base 12, three sand blast nozzles 116 (two shown) and three vacuum nozzles 118 (two shown) are mounted within cylinder 114 above canvas bottom screen 120. Sand is carried up pressurized airline 122 passed through nozzles 116 to scour pole 112, the spent sand is prevented from falling by canvas screen 120 and sucked away by vacuum nozzles 118 down vacuum line 124.

In FIG. 13 is shown a detachable work platform 206 having guard rails 208, mounted on base 12. effectively replacing a cherry picker. In FIG. 14 is shown a remote control surveillance device 212, mounted on base 12 by pedestal 214 and universal joint 216 . This surveillance device is typically a camera, (visible, UV, infrared), a radio, radar or microwave receiver/detector, microphones or other sonic detector, as well known to those skilled in the art.

In FIGS. 16 and 17 show a rotary wire brush arrangement mounted below base 12, frame 228 is attached to base 12 and independent therefrom are four short posts 230 and two longer posts 232, each having a rotary wire brush 234 mounted thereon, chain driven by servomotors 236. Six brushes at staggered levels are necessary because otherwise they get in each others way and do not cover the pole for paint removal.

In FIG. 18 is shown another embodiment, here base 312 has outward facing metal boxes 324, 326, and 328. Each box contains pivot pin 348, pivotable box 352 and slidable box 356, mounting surface engaging rollers 382, the internal arrangements of boxes 324, 326, and 328 are otherwise identical to those shown in FIGS. 3 and 4. This version is suitable for internally cleaning pipes.

In FIG. 10 is shown control panel 126, which has 110 v power leads 128. An exemplary sequence of use is as follows on power button 130 is depressed, then select button 134, followed by priming button 136, which is depressed once for every mil/thousandth of primer desired up to 12 times, then up button 138. Digital readout 146 indicates the setting for example PRIM 3 UP, which is then confirmed by depressing enter button 140. Next select button 134 is pressed again followed by paint button 142 once for every mil/thousandth of paint required, then down button 144, again digital readout 146 indicates the setting for example PAINT 6 DOWN, and then enter button 140 is depressed. The primer and painter thicknesses determine device speed, on depressing start button 148, the device climbs the pole spraying it with 3 mils of primer, it reaches the top, halts, then comes down spraying the pole with 6 mils of paint. The primer and paint thickness set the speed of the device upwards and downwards. The entire process takes something of the order of 10 to 15 minutes for a single 35 foot post, from starting one post to starting the next post, as opposed to about 1½ hours. The priming and painting times are typically 1 to 1½ minutes each. On the device reaching the button of the post in the downward direction off power button 132 is depressed, cutting off power. Tilt sensor on/off button 147 is used to cut off tilt sensors and thus allow the device to go round goose necks on a pole. Should something go wrong during use emergency stop button 150 is depressed stopping motion. Manual override on/off button 149 then allows manual control, while manual override down button 151 brings the device down the pole.

FIG. 11 shows a schematic of a control circuit of the invention. Roller drive motors 152, 154, and 156 are controlled through servo-amplifiers 15153, 155 and 157 respectively controlled through D/A converter 160 from microprocessor 162. Similarly the three actuator motors 164, 166, 168 are independently controlled by independent servo-amplifiers 170, 172, 174 through D/A converter 160 from microprocessor 162. The relative extension of each actuator is provided by transducers 176, 178 and 180, while strain gauge transducer 182 provides indication of roller pressure on the pole, similarly plane tilt sensors 184 and 186 indicate tilt, to microprocessor 162 through A/D converter 188. Tachometer 190, and ascent limit 192, descent limit 194, and emergency stop 196 switches input directly to microprocessor 162. Power supply 198 inputs 5 and 36 VDC to microprocessor 162. Microprocessor outputs to UART 200 which communicates via serial interface 202 with remote control unit 204.

A support trailer (FIG. 19) is conveniently provided having integral 45 gallon primer and paint tanks, and an integral 25 gallon solvent tank for line cleaning. Paint pumps, a compressor, paint lines and tools are carried on the trailer. A spring loaded arm is mounted on the trailer to carry the pole centering device and swing it directly onto the pole, eliminating manhandling and manual lifting.

The primer and paint guns are conveniently Graco PRO guns, although K and R guns are also contemplated. The paint hoses and reels are also conveniently Graco hoses and reels. As those skilled in the art appreciate similar guns, hoses and reels of similar quality can be used.

As those skilled in the art would realize these preferred described details and processes can be subjected to substantial variation, modification, change, alteration, and substitution without affecting or modifying the function of the described embodiments. Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A robotic centering device to engage peripheral surfaces comprising base means at least three peripheral surface engaging drive means operatively associated with said base means separate positioning means to position each said surface engaging drive means in engagement with said surface pressure sensing means operatively associated with at least one of said surface engaging drive means control means for said positioning means, said control means actuating said separate positioning means toward said surface when said pressure sensing means indicates a pressure less than a predetermined value, said control means actuating said separate positioning means away from said surface when said pressure sensing means indicates a pressure greater than said predetermined value.

2. A robotic pole centering device of claim 1, wherein said peripheral surface is externally integral to pole means and said base means comprises ring means to encompass said pole means, said ring means having gate means pivotable between a first closed position and a second open position, whereby said pole means can enter and leave said ring means and said surface engaging drive means project internally of said ring means.

3. A robotic pipe centering device of claim 1, wherein said peripheral surface is internally integral to pipe means and said surface engaging drive means project externally of said base means.

4. A device of claim 2, wherein said control means actuates all said separate positioning means toward said pole means when said pressure sensing means indicates a pressure less than a predetermined value, and said control means actuates all said separate positioning means away from said pole means when said pressure sensing means indicates a pressure greater than said predetermined value.

5. A device of claim 1, wherein said pressure sensing means comprises strain gauge transducer means.

6. A device of claim 2, wherein said positioning means comprises linear actuator means operatively associated with each said pole engaging drive means.

7. A robotic centering device to engage peripheral surfaces comprising base means at least three surface engaging drive means operatively associated with said base means separate positioning means to position each said surface engaging drive means in engagement with said surface each said surface engaging drive means being slidably mounted within pivotable guide means, said guide means being pivotable between a first upper position and a second lower position, and having central pivot means mounted within said base means.

8. A robotic pole centering device of claim 7, wherein said peripheral surface is externally integral to pole means and comprises ring means to encompass said pole means, said ring means having gate means pivotable between a first closed position and a second open position, whereby said pole means can enter and leave said ring means and said surface engaging drive means project internally of said ring means.

9. A robotic pipe centering device of claim 7, wherein said peripheral surface is internally integral to pipe means and said surface engaging drive means project externally of said base means.

10. A device of claim 8, wherein each said pivotable guide means has adjustments means to adjust the play thereof.

11. A device of claim 10 comprising three pole engaging drive means operatively associated with said ring means each said pole engaging drive means including reversible polarity electric motor means driving vertically spaced apart horizontal pole engaging roller means.

12. A device of claim 11 wherein said reversible polarity motor means are operatively interconnected to said roller means by gearing means.

13. A device of claim 11 wherein each said pole engaging drive means is fixedly mounted within first housing means slidably mounted within second housing means said second housing means being pivotally mounted about its center radial to said ring means having free movement between a first upper position and a second lower position set screw means mounted within said ring means whereby said first upper position can be adjusted.

14. A device of claim 13 comprising linear actuator means are operatively associated with said first housing means and third housing means to position each said pole engaging drive means in engagement with said pole means said second housing means being pivotally mounted within said third housing means said third housing means being radially mounted within said ring means.

15. A device of claim 14 comprising pressure sensing means operatively associated with at least one of said pole engaging drive means control means for said positioning means, said control means actuating all said linear actuator means toward said pole means when said pressure sensing means indicates a pressure less than a predetermined value, said control means actuating all said linear actuator means away from said pole means when said pressure sensing means indicates a pressure greater than said predetermined value.

16. A device of claim 15, wherein said pressure sensing means comprises strain gauge transducer means.

17. In combination a robotic centering device to engage peripheral surfaces and a control system therefor said device having base means at least three surface engaging drive means operatively associated with said base means separate positioning means to position each said surface engaging drive means in engagement with said surface pressure sensing means operatively associated with at least one of said surface engaging drive means said control system comprising analog input means indicating the positions of each said separate positioning means said control system comprising analog input means indicating the pressure exerted by said at least one said surface engaging means analog to digital converter means to convert analog inputs to digital inputs to microprocessor means means to compare said digital pressure input to a predetermined reference signal digital output means to control speed of all said surface engaging drive means digital output means to actuate said separate positioning means for each said surface engaging drive means when said digital pressure input differs from said predetermined reference signal digital to analog converter means to convert digital outputs to analog outputs.

18. A combination of claim 17, wherein said digital output means to actuate said separate positioning means causes each said surface engaging drive means to retract from said surface when said digital pressure input is greater than said predetermined reference signal and said digital output means to actuate said separate positioning means causes each said surface engaging drive means to extend toward from said surface when said digital pressure input is less than said predetermined reference signal.

19. A combination of claim 18 additionally comprising paired tilt sensor analog input means, providing tilt information in two vertical planes at right angles to each other, connected to said analog to digital converter means and tachometer means operatively associated with at least one said surface engaging drive means providing direct digital input to said microprocessor means and ascent limit, descent limit and emergency stop switch means providing direct digital input to said microprocessor means.

20. A combination of claim 19 additionally comprising serial digital interface means communicating between said microprocessor and a remote status display and control unit.

* * * * *